May 19, 1925. 1,538,031

C. J. DUNZWEILER

STORAGE BATTERY CONTAINER

Filed Aug. 3, 1923

Inventor
Carl J. Dunzweiler

Attorneys

Patented May 19, 1925.

1,538,031

UNITED STATES PATENT OFFICE.

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA.

STORAGE-BATTERY CONTAINER.

Application filed August 3, 1923. Serial No. 655,451.

*To all whom it may concern:*

Be it known that I, CARL J. DUNZWEILER, a citizen of the United States, residing at Cleveland, in the county of Cuyahoga and State of Ohio, have invented a certain new and useful Improvement in Storage-Battery Containers, of which the following is a full, clear, and exact description.

This invention relates to storage battery containers and particularly to mono-bloc or multiple compartment containers formed of hard rubber, each compartment adapted to constitute an individual container for one cell of the battery.

Batteries utilizing containers of this kind are generally employed as starting and lighting batteries on motor vehicles and they are generally lifted into and out of place by handles which are attached to the end walls. With batteries having these containers considerable difficulty has been encountered in the outward bulging of the end walls with the result that the seal between the end walls and the covers of the endmost cells is broken. This outward bulging frequently results when the batteries are lifted from the automobiles when the hard rubber has been softened by the heat from the engine and from the heat generated by the charging of the battery, the train of lifting being transmitted directly from the handles to the softened end walls, and also by the pull exerted by the so-called hold down which is generally used to hold a battery in its receptacle on the car.

This disadvantage has been overcome somewhat by the use of stiffening rods inserted in the end walls, these stiffening rods serving at the same time for anchorages for the handle screws.

The object of the present invention is to provide a construction and method of attaching the handles which avoids the liability of the end walls bulging, and at the same time does away with the necessity of embodying inserts into the hard rubber.

The invention may be briefly summarized as consisting in certain novel details of construction, and combinations and arrangements of parts which will be described in the specification and set forth in the appended claims.

Figure 1:
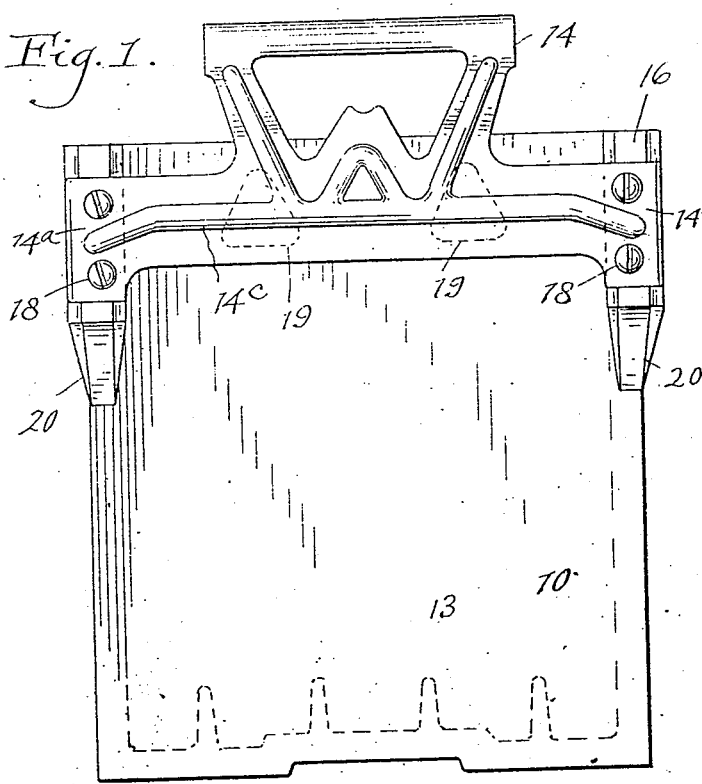
Figure 2:
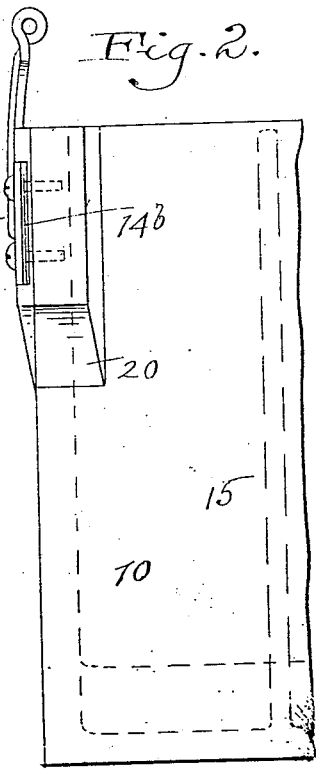
Figure 3:
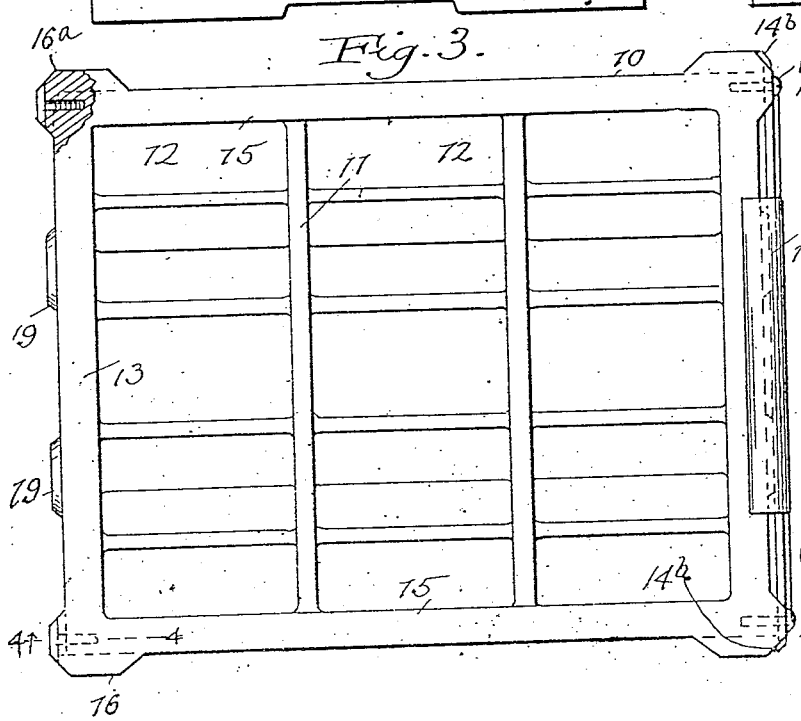
Figure 4:
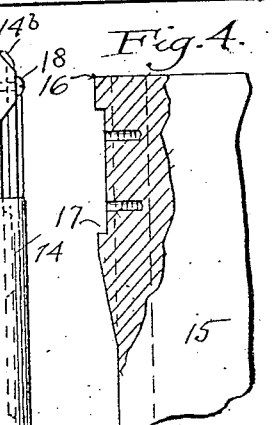

In the accompanying sheet of drawings showing the preferred embodiment of the invention, Fig. 1 is a view looking toward the end of the container with the handle in place; Fig. 2 is a fragmentary side view; Fig. 3 is a top plan view with one of the handles removed and with a small portion in section; and Fig. 4 is a fragmentary sectional view of one corner of the container, the section being taken substantially along the line 4—4 of Fig. 3, looking in the direction indicated by the arrows.

Referring now to the drawings, 10 represents a hard rubber container having transverse partitions 11 forming a number of compartments 12.

In accordance with the present invention, instead of using inserts in the end walls 13 of the container, and instead of attaching the handles which are shown at 14 to the end walls some distance inward from the sides, the handles are extended laterally so as to be attached to the container in line with the side walls 15 of the container, and at the corners where the handles are attached, a special construction is provided to thicken and strengthen the container at these points.

It will be observed that at the four corners of the container, corner lugs or bosses 16 are provided which extend downward from the top for a suitable distance, these lugs or bosses projecting beyond the plane of the end walls and also beyond the plane of the side walls. This is shown in Fig. 3, and also in Figs. 1 and 2, Fig. 1 showing how they project beyond the sides, and Fig. 2 showing how they project beyond the ends.

The portions of the lugs projecting beyond the ends 13 of the container are notched out as shown at 17 to accommodate the end portions 14ª of the handles 14, the lower portions of the handles being wide enough to extend entirely across the ends of the container. The ends of the handles are fastened in place in these notches 17 by screws 18, which it will be observed are in line with the sides 15, the lugs or bosses adding sufficient material to enable the screws to be placed at this point. It might be mentioned at this point that not only do these lugs or bosses provide the necessary material to give good anchorages for the screws 18 which are located in line with the sides, but they also serve as buffers to protect the corners.

By the provision of the notches 17, shoulders are provided above and below the handles; the upper shoulders take part of the load when the battery is being lifted, and also prevent acid from running down under the ends of the handles, and the lower lugs take part of the pull exerted by the hold downs. Thus the screws are relieved of much of the strain.

The above constitutes the principal features of the invention, but certain important details may be employed but though not necessarily provided. For example the extreme ends of the handles are given a slight bevel as shown at 14$^b$ in Figs. 2 and 3, and the lugs or bosses are provided with upright beveled faces 16$^a$ against which the beveled ends of the handles rest. Additionally, the handles which are preferably stamped from sheet metal are provided with strengthening ribs 14$^c$, at least one of which extends practically the full length of the lower portion of the handle, i. e. from a point between the two screws at one end of the handle across to a similar point between the two screws at the other end. Furthermore, the ends of the container between the corner lugs or bosses are preferably provided with pads or lugs 19 against which the intermediate portions of the handles bear; that is to say, each handle is provided with end portions which are attached to the ends of the case at the corner lugs, and between its ends it bears at two points against the pads 19. By this arrangement the handles are spaced from the ends of the container, reducing liability of corrosion from acid running down from the top of the battery.

Additionally, the lower ends of the corner lugs are beveled as shown at 20, the beveling occurring where the lugs project from the ends and sides of the case. This reduces the liability of the container catching on the top of the case or receptacle provided on the automobile to receive the battery.

The construction above described is strong and durable and there is practically no liability of the ends of the container bulging due to the fact that the stresses in lifting are transmitted to the corner lugs or to the case in line with the sides instead of between the sides as heretofore.

I do not desire to be confined to the exact details shown, and I aim in my claims to cover all modifications which do not involve a departure from the spirit and scope of my invention in its broadest aspects.

Having described my invention, I claim:

1. A storage battery container having end walls of hard rubber and provided near the top with corner lugs or projecting portions constituting buffers and metal handles extending across the ends of the container and each having its ends secured to said lugs and held in spaced relation with respect to the hard rubber end wall.

2. A storage battery container having end walls of hard rubber and provided near the top with corner lugs or projecting portions constituting buffers and having notches, and metal handles extending across the ends of the container and each having its ends secured in the notches of said lugs and held in spaced relation with respect to the hard rubber end wall.

3. A hard rubber storage battery container having end walls provided near the top with corner lugs constituting buffers and with intermediate lugs, and handles extending across the ends of the container and each having its ends secured to the two outermost lugs and between its ends bearing against an intermediate lug.

4. A hard rubber container for storage batteries having corner enlargements constituting buffers, handles extending across the ends of the container and secured at their ends to the corner enlargements, and means to space the intermediate portions of the handles from the container.

In testimony whereof, I hereunto affix my signature.

CARL J. DUNZWEILER.